Aug. 17, 1965

F. SOLOMON ETAL 3,201,281

NEGATIVE ELECTRODE, METHOD AND MACHINE FOR MAKING THE SAME

Filed March 20, 1962

INVENTORS:
FRANK SOLOMON
ROBERT F. ENTERS
RENATO DI PASQUALE

BY Irving Holtzman
ATTORNEY

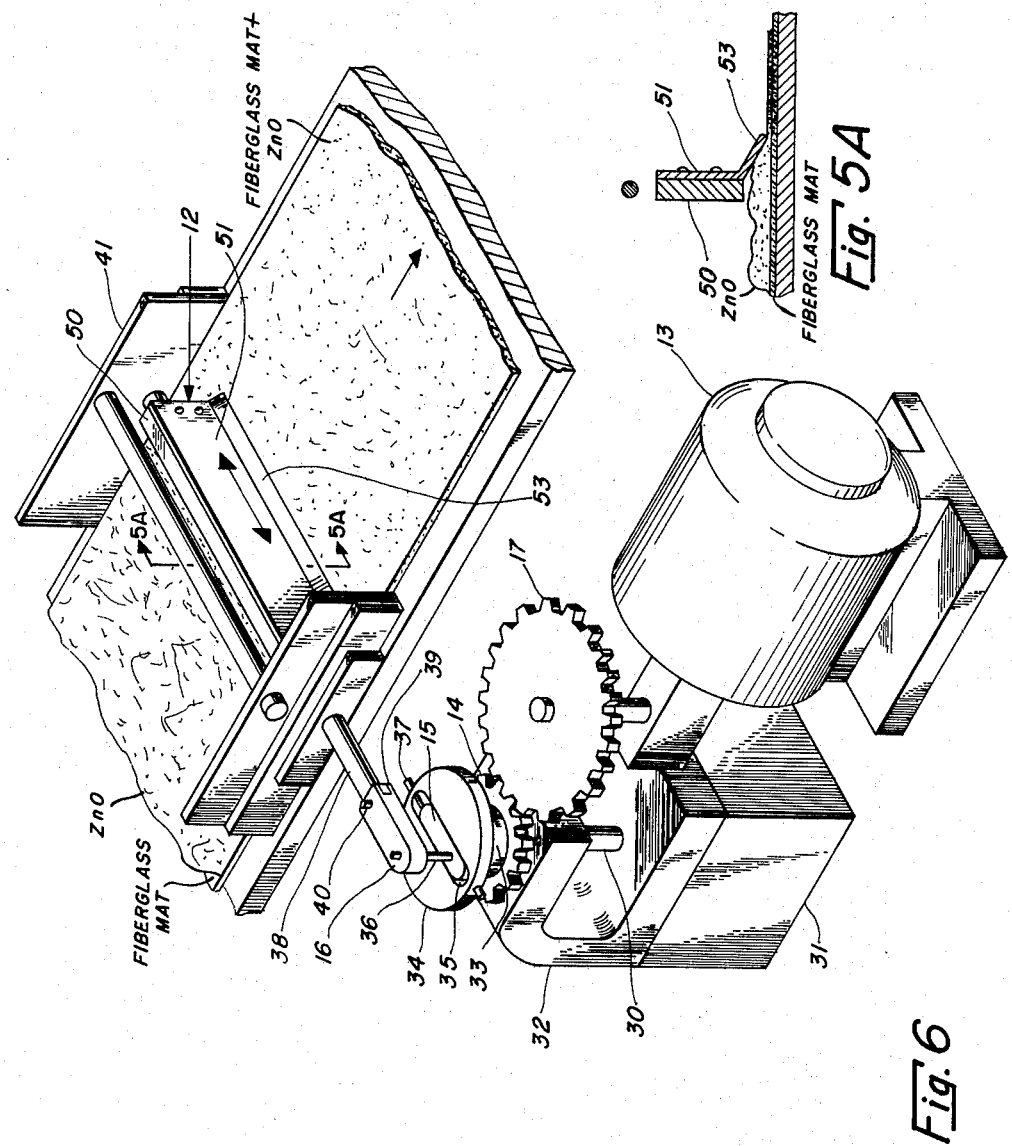

United States Patent Office 3,201,281
Patented Aug. 17, 1965

3,201,281
NEGATIVE ELECTRODE, METHOD AND MACHINE FOR MAKING THE SAME
Frank Solomon, Lake Success, N.Y., and Robert F. Enters, Hackensack, and Renato Di Pasquale, Rutherford, N.J., assignors to Yardney International Corp., New York, N.Y., a corporation of New York
Filed Mar. 20, 1962, Ser. No. 180,952
8 Claims. (Cl. 136—30)

This invention relates to electric batteries, and more particularly, to a new and improved negative electrode for use in alkaline silver-zinc batteries and to improved methods of producing such an electrode.

Heretofore negative electrodes for silver-zinc batteries, particularly of the so-called dry-charged type which are ready for operation upon the addition of electrolyte, were made by preparing a thick paste from powdered zinc oxide and water or from zinc oxide and aqueous potassium hydroxide solution. This was then pasted onto a conductive support and reduced. The resulting pasted plate was then electrolytically converted from zinc oxide to spongy zinc metal. A dry-charged battery of the silver-zinc type will be understood to be one whose positive electrode, prior to introduction of the electrolyte, is in an oxidized state (i.e. silver oxide) while the active material of the negative electrode is principally active metallic zinc.

The electrodes produced in this manner—while fully satisfactory in the early stages of battery life—were found, however, to lack stability over long time spans. As a result of repeated charges and discharges to which a battery is subjected in service, the peripheral areas of the negative electrode surface are gradually depleted of active material, leading to a decrease of the area exposed to electrochemical action and resulting in a progressive drop in cell capacity. Moreover, the zinc penetrated into the separator material employed, shorting the cells.

It is an object of the present invention to provide a negative electrode wherein such erosion has been eliminated and which as a result, is more durable and stable.

It is a further object of the invention to provide a silver-zinc battery which in service retains a generally constant capacity and whose performance is less affected by repeated charging and discharging.

It is another object of the invention to provide an improved method for producing a negative electrode having the above-mentioned characteristics.

It is also an object of the present invention to provide a zinc electrode of the above type having an excess of zinc oxide.

It is finally an object of the invention to provide improved equipment for producing such a negative electrode.

Other and more detailed objects will be apparent from the following description.

In accordance with one feature of the present invention, the electrode comprises a substantially inert conductive support, for example in the form of a solid or perforated copper or silver sheet, sandwiched between two solid or perforated sheets of zinc metal and attached thereto, for example, by hot pressing or local spotwelding. The assembly, thus obtained, is sandwiched between two glass fiber mats impregnated with zinc oxide, thereby forming a completed electrode. In alternative forms of the invention, the sheets of zinc metal mentioned above may be replaced by subdivided zinc (e.g. electroplated zinc) where higher discharge rates are required or in other cases by matting or expanded-zinc-metal materials.

An electrode prepared in accordance with the above principles has many advantages. By the use of glass-fiber mats to hold zinc oxide, erosion phenomena are greatly reduced and capacity stability is improved in proportion.

A further advantage is high versatility offered by an electrode of this type. By providing a sufficient amount of zinc sheet metal to insure the required capacity, the negative is ready for discharge and may be used in the dry-charged battery construction. On the other hand, if the negative electrode is to be in its uncharged state upon admission of electrolyte, the zinc sheet may be reduced in size or suppressed altogether. If present, it will serve to raise the average electrode density and provide a reserve of zinc metal to minimize corrosion effects. In addition to holding zinc oxide, the glass-fiber mat may contain negative-plate expanders such as $Mg(OH)_2$ or asbestos powder. Since the impregnated mats are on the outside of the electrode, the expander is ideally located to overcome the densification occurring in the outer layers of active material.

A still further advantage of the electrode made in accordance with the invention is its economy. Since all metallic components are made of sheet metal which need not necessarily be perforated, the cost of processing is less. The impregnation with zinc oxide of the glass fiber sheets may be done in a continuous fashion, as described elsewhere in this specification thereby reducing labor costs to a minimum. In cases where the negative electrode does not require the presence of zinc metal, construction is particularly simple, since it involves only two zinc oxide-impregnated glass fiber mats and a current collecting member, such as wire, placed between the two mats. In cases where a conductive sheet is to extend over the entire electrode surface area, a conductive sheet is substituted for the wires and a current collecting tab may be provided as an integral part of said sheet or else be conductively attached to it by known means.

It is to be understood that many variations may be made in the manner of practicing the invention.

Preferred embodiments and means of achieving same will be hereinafter described with reference to the accompanying drawings given merely by way of example, and in which:

FIG. 5A is a partial cross-sectional view of the doctor blade shown in FIG. 6, taken along line 5A–5A'; and FIG. 6 is an enlarged perspective view partly in section of the device illustrated in FIG. 5 showing the details of the doctor blade assembly.

Figure 1:
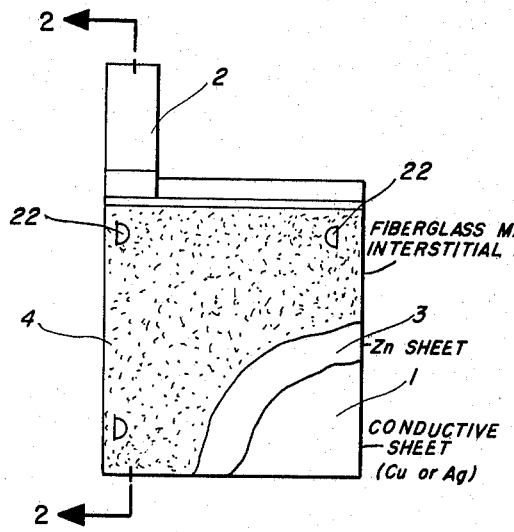
FIG. 1 is an elevational view partly in section of a negative electrode embodying the present invention.
Figure 2:
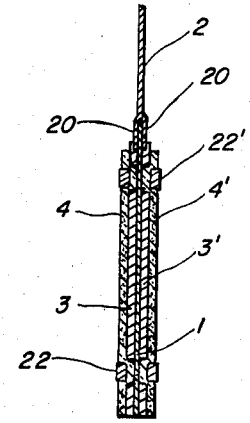
FIG. 2 is a cross-sectional view taken along line 2–2' of FIG. 1.

Referring to FIGS. 1 and 2, there is shown an electrode comprising a thin solid metal sheet 1 sandwiched between two zinc metal sheets 3 and 3', the outer surfaces of which are covered respectively with sheets 4 and 4' of glass fiber material impregnated with zinc oxide. The central sheet 1 is preferably made of silver or copper and is provided with an extension 2 serving as a terminal tab.

Terminal tab 2 may be integral with sheet 1 or may take the form of a tab which is welded onto sheet 1. In the modification shown in FIGS. 1 and 2, the tab 2 is provided with a pair of legs 20 which straddle the top of sheet 1 and to which it is welded. In the modification of the invention illustrated in the drawings, the tab 2 is made of silver and the plate is of copper.

While silver and copper are the preferred materials, sheet 1 can be made of any suitable conductive substance, such as silver-plated nickel and the like. Furthermore it may be either solid or perforated. In cases where a perforated material is used, the percentage of open area may vary within very wide limits. The thickness of the sheet 1 will depend on the material used. For silver and copper, the thickness will be of the order of .002 to .010 inch.

Sheet 1 is sandwiched between two zinc sheets 3 and 3' to which it is attached by hot pressing or spot welding. While in the embodiment shown, zinc plates 3 and 3' are made of solid metal, perforated metal may be used if desired. In the latter case, the percentage of open area will vary considerably depending on the characteristics of the finished electrode. The same is true of thickness of the zinc sheets which may range from .002 to .020".

The sub-assembly comprising sheet 1 sandwiched between zinc plates 3 and 3', carries on both sides thereof a glass-fiber mat (Fiberglas) impregnated with zinc oxide. While glass fiber mat is the preferred material because of its high porosity, substantial inertness in alkali, ability to hold zinc oxide and the spongy zinc to which zinc oxide is converted on charge, availability, ease of handling and other favorable mechanical properties, any other natural or synthetic fibrous material available in mat form may be used as a carrier for zinc oxide providing it meets the basic requirement of sufficient porosity and relative inertness in alkali.

The thickness of the glass-fiber mat or similar material will vary depending on the requirement of the battery. In general the thickness will vary between about 5 and 60 mils and preferably will be about 10 mils.

The zinc oxide-loaded mats are attached to the electrode in any convenient manner. One means is to provide a plurality of tabs 22 cut in the zinc sheets 3 and 3'. These are bent outwardly to receive the zinc oxide loaded glass fiber mat and are then bent inwardly to secure said glass mat to the zinc plate.

The thickness of the zinc oxide-impregnated mats will vary depending on the amount of zinc oxide they contain. As a rule it will range from .010 to .030". The amount of zinc oxide per unit of surface area of carrier material will vary depending on its thickness and the requirements. For a 10-mil-sheet it usually ranges from 0.3 to 0.5 gram.

Any known method may be used for incorporating zinc oxide into the fibrous carrier. However, particularly good results were obtained using apparatus described elsewhere in this specification.

Figure 3:
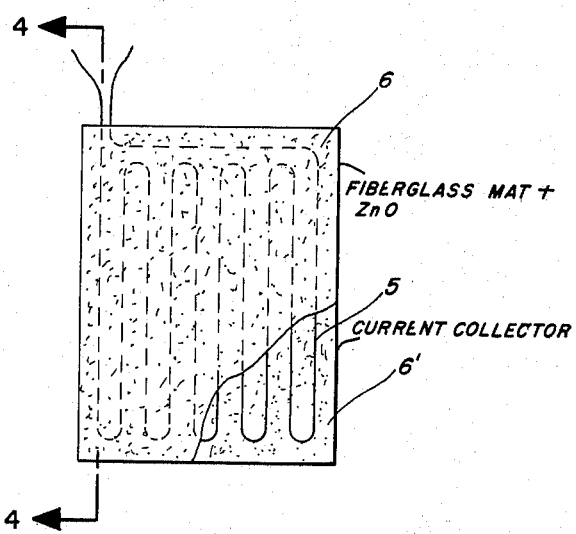
FIG. 3 is an elevational view partly in section of another embodiment of this invention.
Figure 4:
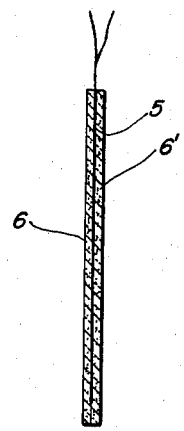
FIG. 4 is a cross-sectional view of the embodiment shown in FIG. 3, taken along line 4–4'.

FIGS. 3 and 4 show an embodiment of the negative electrode somewhat different from the one represented in FIGS. 1 and 2 and which is particularly suitable for use in small-size cells adapted to operate at light current drains. It comprises two sheets of glass-fiber 6, 6' mat impregnated with zinc oxide and pressed in face-to-face relationship with a current collecting wire 5 interposed between them. The impregnated glass-fiber mats are substantially similar to those described with reference to FIGS. 1 and 2. It will be noted that the simplification consists in the elimination of zinc plates 3 and 3' and the substitution of current collecting wire 5 for metal sheet 1.

Figure 5:
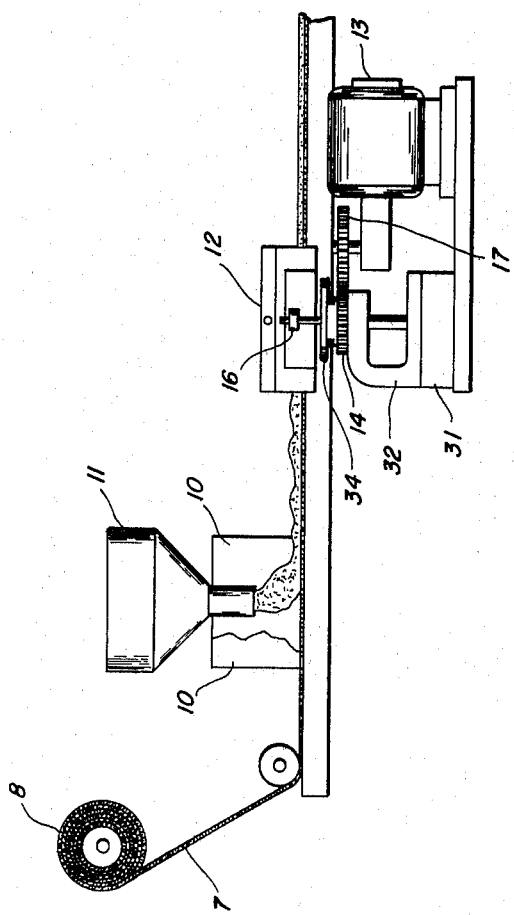
FIG. 5 is a diagrammatic view of an apparatus for impregnating Fiberglas with zinc oxide in accordance with the invention.

As already mentioned, in preparing zinc oxide-loaded mats, particularly satisfactory results were obtained by the use of a special apparatus. FIG. 5 shows a diagrammatic view of one embodiment of such an apparatus which operates substantially as follows:

A continuous web of fiber-glass mat 7 is supplied from a roll 8 and passes through a trough 10 under a dispenser 11 which continuously deposits zinc oxide in powdered or paste form onto the moving strip.

Upon receiving the appropriate amount of impregnating material, the web passes under a levelling doctor blade 12 which according to one feature of the invention is subjected to an oscillating motion transversely to the strip. When the doctor blade is properly positioned in relation to the moving web, the impregnating material will be forced into the web resulting in its complete filling. The use of an oscillating rather than a stationary doctor blade was found to be a major factor in achieving satisfactory results by facilitating a smooth and continuous flow of impregnating material and by preventing its piling up ahead of the blade.

In cases where it is impregnated with a paste, the strip, upon leaving the doctor blade, proceeds into a drying section which brings it to a damp-dry condition. Following the drying operation, the impregnated strip may be passed through compression rolls or may be cut up for pressing in a hydraulic press. In the alternative, the moving strip may be air dried and cut sections thereof may then be hung for further drying. If the strip is filled with powdered material, the drying section is omitted.

The doctor blade 12, in this embodiment of the invention, as best seen in FIGS. 5A and 6, consists of a support member 50 to which is secured plate member 51. The lower end of plate 51 consists of a flange 53 which forms an obtuse angle with the vertically extending portion of plate 51. Flange 53, as best seen in FIG. 5A, forms an acute angle with the plane of the surface of mat 7. This angle may vary from 10° to 30°. By means of this arrangement, the leading edge of the zinc oxide paste or powder material enters into the angle formed by said flange and is gradually compacted into the mat 7, forming a smooth surface thereon of zinc oxide material.

As can be seen from FIG. 6, which shows an enlarged view of the oscillating doctor blade and drive mechanism, the power source is motor 13. Motor 13, through proper coupling, turns the driver gear 17 around an axis which is perpendicular to the axis of the motor shaft (not shown). This in turn drives the driven gear 14 which is supported by a shaft 30 that rotates in a bearing (not shown) in block 31. The upper portion of shaft 30 is supported in a bearing (not shown), located in the horizontal arm of support bracket 32.

Secured to the upper surface of gear 14 is a spacer 33 which in turn is secured to cam plate 34. Cam plate 34 is provided with a slot 35 in which is inserted an adjustable plate 15.

Extending upwardly from the adjustable plate 15 and secured thereto in any suitable manner is eccentric plate arm 36 which is secured to the doctor blade 12 in a manner described in greater detail below.

A pair of diametrically disposed threaded holes are bored through the circumferential surface of plate 34 terminate at slot 35. A pair of set screws 37 are inserted in said holes and serve to hold adjustable plate 15 in place. By varying the degree to which the respective screws are turned in, the position of the axis of eccentric plate arm 36 may be displaced from the center of cam plate 34. In this manner the axis of arm 36 may be offset from the axis of rotation of gear 14.

Moveably secured to the top of arm 36 is a link 16 whose other end is likewise moveably attached to shaft 38 of doctor blade 12. Link 16 is provided with a pair of lugs 39 in between which the head of the shaft 38 fits. The lugs 39 and the head of shaft 38 are provided with holes in registration with each other through which a securing pin 40 is inserted.

Shaft 38 of the doctor blade 12 is carried by support blocks 41.

In operation, the plate 15 is adjusted so that axis of arm 36 is offset with respect to the axis of rotation of shaft 30. The eccentric rotating motion imparted to arm 36 as a result of the rotation of cam plate 34 imparts an oscillatory motion to link 16 which in turn is conveyed to the doctor blade 12.

As described above, the doctor blade oscillates back and forth above and in contact with web of fiber glass onto which has been placed, for example, zinc oxide paste. The amplitude and frequency of oscillation are not critical and may range from ⅛ to 1 inch and from 100 to 1,000 strokes per second depending on speed of operation, amount of zinc oxide per unit length of web and other factors.

The forward movement of the web can be achieved in any desired manner ranging from manual pull to a wholly mechanized system which can employ any suitable driving means such as spools, rollers, etc. The speed may range from 1 to 25 feet per minute depending on whether the pull is manual or automatic, the thickness of the web and other factors.

Whereas the invention has been described with reference to specific forms thereof, it will be understood that many changes and modifications may be made without departing from the spirit of this invention.

What is claimed is:

1. In a battery cell, an electrode comprising a sheet of an electromechanically active elemental metal; a fibrous electrically insulating mat overlying at least one surface of said sheet and mechanically secured thereto; and a mass of particles of an oxide of said metal substantially filling the interstices of said mat and contacting said sheet.

2. In a battery cell, an electrode comprising a generally planar current-collecting member of a material of relatively high electrical conductivity; a pair of sheets of an electrochemically active metal having a lower electrical conductivity overlying respective faces of said member and in electrical contact therewith; a fibrous insulating mat overlying respective outer surfaces of each of said sheets and mechanically bonded thereto; and a mass of particles of an oxide of said metal substantially filling the interstices of said mats and contacting said sheets.

3. In a battery cell, an electrode comprising a sheet of an electrochemically active elemental zinc; a fibrous electrically insulating mat overlying at least one surface of said sheet and mechanically secured thereto; and a mass of particles of zinc oxide substantially filling the interstices of said mat and contacting said sheet.

4. In a battery cell, an electrode comprising a generally planar current-collecting member of a material of relatively high electrical conductivity; a pair of sheets of an electrochemically active zinc having a lower electrical conductivity overlying respective faces of said member and in electrical contact therewith; a fibrous insulating mat overlying respective outer surfaces of each of said sheets and mechanically bonded thereto; and a mass of particles of zinc oxide substantially filling the interstices of said mats and contacting said sheets.

5. In a battery cell, an electrode comprising a sheet of electrochemically active elemental zinc; a fibrous electrically insulating glass-fiber mat overlying at least one surface of said sheet and mechanically secured thereto; and a mass of particles of zinc oxide substantially filling the interstices of said mat and contacting said sheet.

6. In a battery cell, an electrode comprising a generally planar current-collecting member of a material of relatively high electrical conductivity; a pair of sheets of an electrochemically active zinc having a lower electrical conductivity overlying respective faces of said member and in electrical contact therewith; a fibrous insulating glass-fiber mat overlying respective outer surfaces of each of said sheets and mechanically bonded thereto; and a mass of particles of zinc oxide substantially filling the interstices of said mats and contacting said sheets.

7. In a battery cell, an electrode as defined in claim 6 wherein said member is composed of a metal selected from the group consisting of silver and copper and has a thickness on the order of 0.002 and 0.010 inch, said sheets each having a thickness ranging between substantially 0.002 and 0.020 inch, said mats having a thickness ranging between substantially 5 and 60 mils.

8. An alkaline battery cell comprising a silver/silver oxide positive electrode; a negative-electrode assembly juxtaposed with said positive electrode; and an alkaline electrolyte immersing at least part of said electrode and said assembly, said negative-electrode assembly consisting essentially of a generally planar current-collecting member of a material of relatively high electrical conductivity, a pair of sheets of an electrochemically active zinc having a lower electrical conductivity overlying respective faces of said member and in electrical contact therewith, a fibrous insulating glass-fiber mat overlying respective outer surfaces of each of said sheets and mechanically bonded thereto; and a mass of particles of zinc oxide substantially filling the interstices of said mats and contacting said sheets.

References Cited by the Examiner

UNITED STATES PATENTS

| 1,197,737 | 9/16 | Hayden | 136—67 |
| 2,844,641 | 7/58 | Lang et al. | 136—175 X |
| 3,056,849 | 10/62 | Warren et al. | 136—83 |
| 3,069,486 | 12/62 | Solomen et al. | 136—30 |
| 3,108,909 | 10/63 | Stanimirovitch | 136—176 X |

JOHN H. MACK, *Primary Examiner.*

MURRAY TILLMAN, *Examiner.*